(12) United States Patent
Horikoshi et al.

(10) Patent No.: US 6,491,552 B2
(45) Date of Patent: Dec. 10, 2002

(54) ELECTRICAL CONNECTION STRUCTURE FOR ELECTRONIC APPARATUS

(75) Inventors: Seita Horikoshi, Zama (JP); Hiroyuki Noguchi, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/833,115

(22) Filed: Apr. 11, 2001

(65) Prior Publication Data

US 2002/0048975 A1 Apr. 25, 2002

(30) Foreign Application Priority Data

Apr. 14, 2000 (JP) .......................................... 2000-114327

(51) Int. Cl.$^7$ ................................................ H01R 4/48
(52) U.S. Cl. ....................................... 439/862; 361/785
(58) Field of Search ............................ 439/78, 81, 289, 439/329, 862; 361/683, 752, 784, 785, 787

(56) References Cited

U.S. PATENT DOCUMENTS

| | | | | |
|---|---|---|---|---|
| 4,948,379 A | * | 8/1990 | Evans | 439/329 |
| 5,659,213 A | * | 8/1997 | Imashiro et al. | 310/71 |
| 5,941,739 A | * | 8/1999 | Yoo | 439/840 |
| 6,095,856 A | * | 8/2000 | Horan et al. | 439/567 |
| 6,201,704 B1 | * | 3/2001 | Poplawski et al. | 361/753 |
| 6,208,508 B1 | * | 3/2001 | Ruch et al. | 361/686 |

OTHER PUBLICATIONS

JAPUPA 5–13115 No date.
JAPUPA 5–13116 No date.
JAPUPA 11–339920 No date.
JAPUPA 2000–021468 No date.
JAPUPA 2000–012124 No date.
JAPUPA 5–13115, JAPUPA 5–13116, JAPUPA 11–339920, JAPUPA 2000–021468 and JAPUPA 2000–012124.

* cited by examiner

Primary Examiner—Brian Sircus
Assistant Examiner—Thanh-Tam Le
(74) Attorney, Agent, or Firm—Carlos Munoz-Bustamante

(57) ABSTRACT

An electronic component unit such as a speaker unit which is to be installed in the main body of a notebook-sized PC, includes an integral connector with compression type terminals that are connected with lead wires to a speaker. When the speaker unit is disposed on a speaker-unit mounting portion, the compression type terminals are disposed at a position where they contact with the lands of a system board. The speaker unit is fixed by inserting screws into the support portions of a housing, and at the same time, the compression type terminals are elastically contacted with the lands and electrically connected thereto.

1 Claim, 10 Drawing Sheets

(A)

(B)

ELECTRICAL CONNECTION STRUCTURE FOR ELECTRONIC APPARATUS

FIELD OF THE INVENTION

The present invention relates to an electrical connection structure for an electronic component unit that is applied to computers and electronic equipment, and more particularly to an electrical connection structure for electrically connecting a terminal portion of a Compression type connector, equipped in an electronic component unit, to an electrode portion on a circuit board mounted on electronic equipment when installing the electronic component unit in the electronic equipment.

BACKGROUND OF THE INVENTION

In general, electronic equipment employs a connector to electrically interconnect a circuit board, an electronic component, an electronic device, etc. When assembling such electronic equipment, the connector is frequently connected by manual operation.

FIG. 10 illustrates a conventional notebook-sized personal computer (hereinafter referred to as a notebook-sized PC) in which a speaker unit is mounted on a PC main body portion and connected to a system board (main board).

In FIG. 10 is shown the rear of the speaker unit 100 including speakers 104 disposed at the laterally opposite positions on a front face (side facing in direction of arrow FR in the drawing) of a frame 102 constituting the speaker unit 100, respectively. The lead wires (harnesses) 108 connected to the speakers 104 through the interior of the frame 102 protrude from the lower portion of a mounting portion 106 provided on the rear of the frame 102, and a plug-in type connector 110 is connected to the ends of the lead wires 108.

A support block 114 for mounting the speaker unit 100 is provided on the bottom surface of a housing 112 constituting the lower portion of the housing of the PC main body portion. Furthermore, the system board 116 is installed within the housing 112, and a connector 118 (plug-in type) which is paired with the connector 110 on the side of the speaker unit 100 is mounted on the system board 116.

When mounting this speaker unit 100 on the notebook-sized PC, the speaker unit 100 is first fixed on the support block 114 of the housing 112 by means of screws 120. Then, the connector 110 is plugged into the connector 118 on the system board 116 thereby effecting mechanical and electrical connection.

In the notebook-sized PC market, pricing has become ever more competitive in recent years. Because of this, it is an important consideration to reduce manufacturing costs by simplifying operation to reduce the number of assemblers. Therefore, in the aforementioned operation of installing an electronic component unit, reconsideration of the assembly efficiency has also been required. Particularly, there has been a desire to move away from the manual operation of connecting the connector, which is complicated and tends to cause connection failure such as half-locking.

On the other hand, a wide variety of connectors suitable for various uses, in addition to a general plug-in type, have been developed and put to practical use. As an example, spring connectors are known, the assembly structure being disclosed in Japanese Published Unexamined Patent Application Nos. 5-13115 and 5-13116.

The spring connectors are employed when constituting a high-voltage circuit. The spring connectors include a fixed resistor and are also equipped with a terminal portion consisting of a coil spring. The spring terminal portion is pressed against the contact portion of a corresponding component, whereby an electrical connection is established.

In the above-mentioned prior art, a connecting fitting, connected with a fixed resistor fitted into a coil spring and lead wires, is inserted and mounted within the housing of the connector, and furthermore, the coil spring, the lead terminals of the fixed resistor, and the connecting fitting are not firmly connected by soldering or the like, but they are connected by press fitting and elastic gripping means so that they can be electrically conductive. Also, in order to easily enhance product yield and productivity, a structure has been proposed in which the assembly can be automated. To electrically interconnect circuit boards, another technique for mounting a spring connector on one of the circuit boards and connecting it with the electrode portion of the other circuit board is disclosed in Japanese Published Unexamined Patent Application Nos. 11-339920, 2000-021468, 2000-012124, 10-261858.

This conventional spring connector is a type in which the spring terminal portion is elastically contacted with the contact portion of the corresponding component, but since the connector is singly employed, a structure for fixing the connector housing to a corresponding component, and the installing operation of the structure, are required. Therefore, although the terminal portion is a spring type, the manner in which the spring connector is used is essentially the same as the aforementioned plug-in type connector.

SUMMARY OF THE INVENTION

In view of the aforementioned facts, it is an object of the present invention to provide an electrical connection structure for an electronic component unit that is capable of facilitating an assembly operation in installing the electronic component unit. Another object of the invention is to provide an electrical connection structure for an electronic component unit which is capable of preventing connection failure and reducing manufacturing costs. Still another object of the invention is to provide a computer and electronic equipment to which the electrical connection structure is applied.

To achieve the above objects, according to an aspect of the present invention there is provided an electrical connection structure for electrically connecting an electronic component unit, which is to be installed in an electronic apparatus, to a circuit board mounted on the electronic apparatus, the structure comprising: an electrode portion provided on the circuit board; and a connector, which is mounted on the electronic component unit and equipped with compression type terminals, the terminals being connected to lead wires of an electronic component included in the electronic component unit, and being contacted with the electrode portion, compressed, and electrically connected thereto when the electronic component unit is mounted on the circuit board.

In the aforementioned electrical connection structure for an electronic component unit, a connector with compression type terminals is mounted integrally on an electronic component unit, and the compression type terminals of the connector are connected with the lead wires of an electronic component equipped in the electronic component unit.

With such a connector, when the electronic component unit is assembled to the circuit board, the compression type terminals of the connector are contacted with the electrode portion of the circuit board and are compressed and electrically connected. Thus, the assembly operation in installing an electronic component unit in electronic equipment is made easy. In addition, connection failure, such as half-locking, etc., is prevented because there is no manual connection of the connector. Furthermore, the number of assemblers is reduced and the manufacturing costs are reduced.

In addition, as the electronic component unit and the connector can be connected by lead wires, the connecting operation is easy, there is no need to prepare a circuit board for connecting the connector, and there are various freedoms in operation.

The electronic component unit used herein includes a unit in which an electronic component or device, such as a speaker, a microphone, an LCD display, etc., is equipped with a connector. The electronic component (portion which functions electrically), such as a speaker, etc., and the connector are connected by lead wires or cables.

In the aforementioned electrical connection structure for an electronic component unit, the connector may be provided with a first engaging portion, and the electronic component unit may be provided with a first engaged portion which is engaged by the first engaging portion.

When the connector is mounted on the electronic component unit, the first engaging portion engages the first engaged portion so that the connector is held by the electronic component unit. Therefore, the mounting operation can be easily performed without employing a fixing means such as screws, an adhesive, etc.

The aforementioned electrical connection structure for an electronic component unit may further include a fixing means, disposed near the connector, for fixing the electronic component unit to the circuit board.

For example, if fixing means such as hooks, screws etc., is disposed near the connector, the electrical connection between the compression type terminals and the electrode portion becomes firm when the electronic component unit is fixed to the circuit board. Therefore, even if the compressing force of the compression type terminals varies, or the circuit board warps, the compression type terminals reliably contact with the electrode portion, whereby connection failure, etc., can be avoided. In addition, resistance to vibration is enhanced by this disposition and therefore a satisfactory connection state is maintained.

In the aforementioned compression type terminal, a contact portion, which contacts with the electrode portion and is compressed by elastic deformation and electrically connectable, is provided on one end of a main body portion formed from an electrically conductive metal, and a connecting portion to which the lead wires are connected is provided on the other end. These portions are formed integrally with each other. Furthermore, the main body portion may be equipped with a second engaging portion which engages a second engaged portion provided in the housing of the connector.

If the compression type terminal is constructed so that the contact portion, which contacts with the electrode portion, and the connecting portion, which connects the lead wires, are connected integrally to the main body portion, the assembling of the terminal to the connector becomes easy. In addition, the second engaging portion engages the second engaged with portion provided in the housing of the connector, whereby the terminal is fixed. Therefore, the terminal is easily assembled without providing additional fixing means.

The aforementioned electrical connection structure for an electronic component unit may further have: a support portion for supporting the electronic component unit at the electrically connectable position; a third engaged portion for preventing movement of the electronic component unit in one direction on a plane approximately perpendicular to the mounting direction when engaged by a third engaging portion provided in the electronic component unit; and a fourth engaged portion for preventing movement of the electronic component unit in a direction perpendicular to the one direction on the plane when engaged by a fourth engaging portion provided in the electronic component unit, when the electronic component unit is disposed in a position where the compression type terminal is electrically connectable with the electrode portion, If the electronic component unit is disposed in a position where the compression type terminal is electrically connectable with the electrode portion, the unit is supported by the support portion at the connectable position. At the same time, the third engaging portion provided in the electronic component unit engages the third engaged portion, whereby movement of the electronic component unit in one direction on a plane approximately perpendicular to the mounting direction of the electronic component unit is prevented. Also, the fourth engaging portion provided in the electronic component unit engages the fourth engaged portion, whereby movement of the electronic component unit in a direction perpendicular to the one direction on the plane is prevented.

With this, if the electronic component unit is disposed at a predetermined position where it is electrically connected with the circuit board, the compression type terminal is aligned with the electrode portion. Therefore, if only the electronic component unit is disposed at the predetermined position, it can be fixed as it is with screws or the like, without positioning the unit with respect to the circuit board, or holding the unit by hands. Thus, assembling of the electronic component unit becomes simple.

The present invention is also applicable to a computer or electronic apparatus equipped with the aforementioned electrical connection structure for an electronic component unit.

A preferred embodiment of the invention will now be described, by way of example only, with reference to the accompanying drawings.

DETAILED DESCRIPTION OF THE INVENTION

Figure 1:
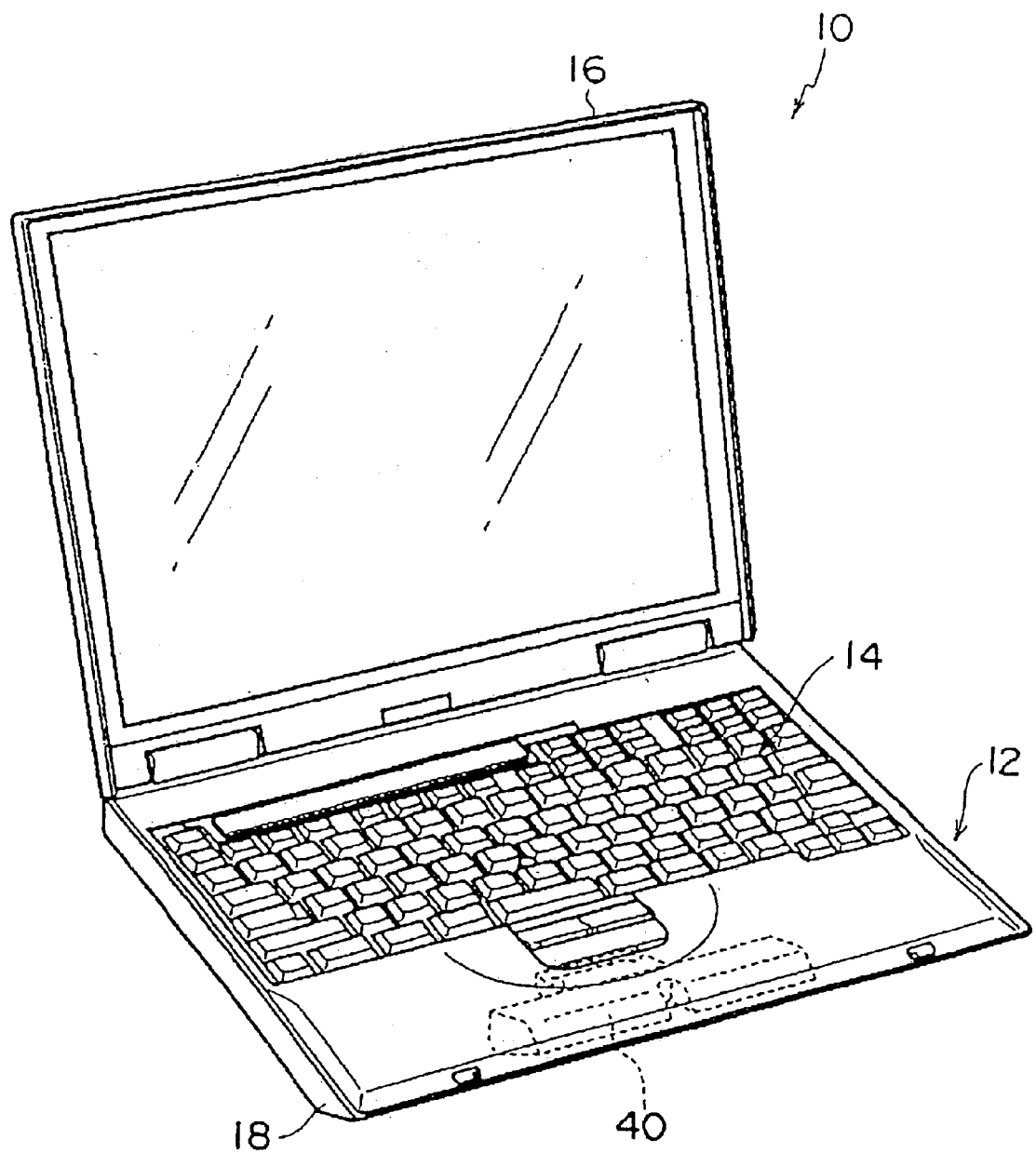
FIG. 1 is a perspective view showing a notebook-sized PC according to a preferred embodiment of the present invention.
Figure 2:
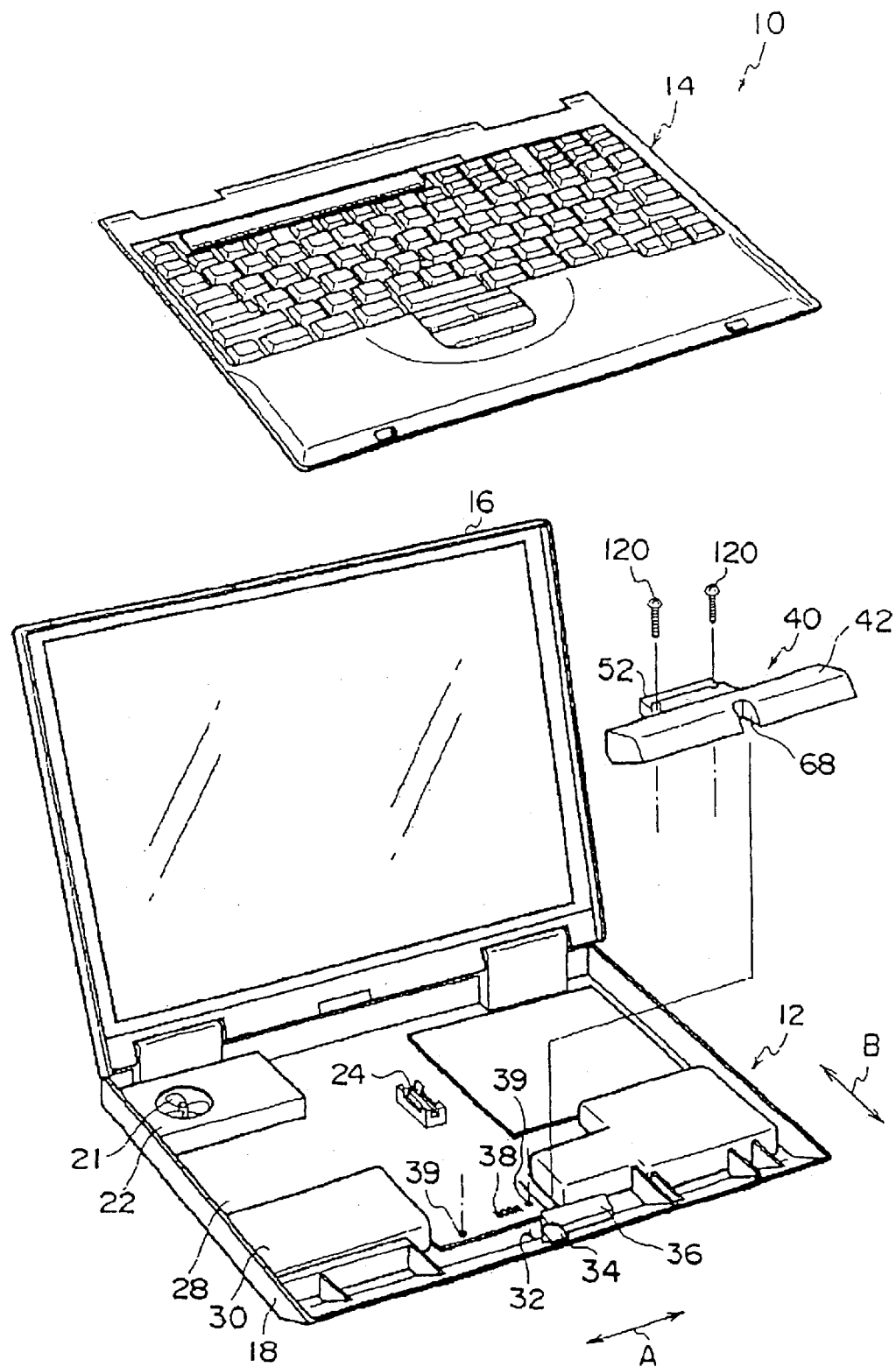
FIG. 2 is a perspective view showing the notebook-sized PC with the keyboard unit and speaker unit removed to show the interior structure of the PC main body.

In FIGS. 1 and 2 there is shown a notebook-sized personal computer 10 (hereinafter referred to as a notebook-sized PC) in accordance with the preferred embodiment. As illustrated in FIG. 1, the PC main body 12 of the notebook-sized PC 10 has a detachable keyboard unit 14 disposed on the upper surface and a liquid crystal display (LCD) unit 16 rotatably supported at approximately the rear edge.

The PC main body 12 includes (1) a system board 28, mounting a connector 24 to be electrically connected with the keyboard unit 14, a central processing unit (CPU), memory, peripheral controller chips, etc., (2) a CPU cooler 22 equipped with a fan 21 for cooling the CPU, (3) a hard-disk drive (HDD) 30, (4) a speaker unit 40, and (5) a storage drive (not shown), such as a floppy-disk drive (FDD), a CD-ROM drive, etc.

The speaker unit 40 to which the electrical connection structure according to the preferred embodiment is applied is fixed by two screws 120 to a speaker-unit mounting portion 32 provided on approximately the center of the front portion of the PC main body 12.

A compression type connector 50 is installed integrally on the speaker unit 40 (the details will be described later), and lands (electrode portion) 38 to which the connector 50 is connected are patterned on the system board 28.

Figure 3:
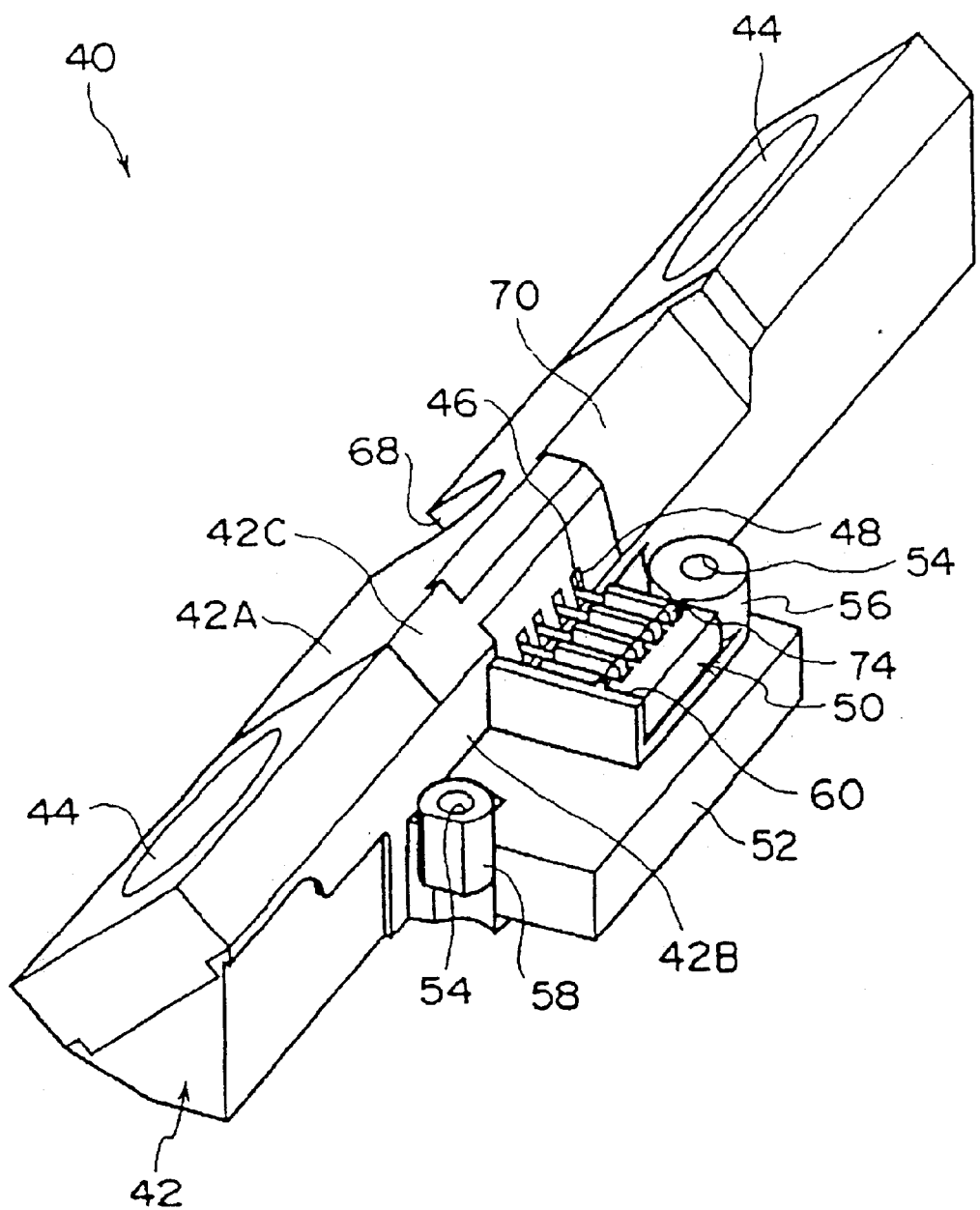
FIG. 3 is a perspective view showing the mounting face side of the speaker unit of FIG. 2.
Figure 4:
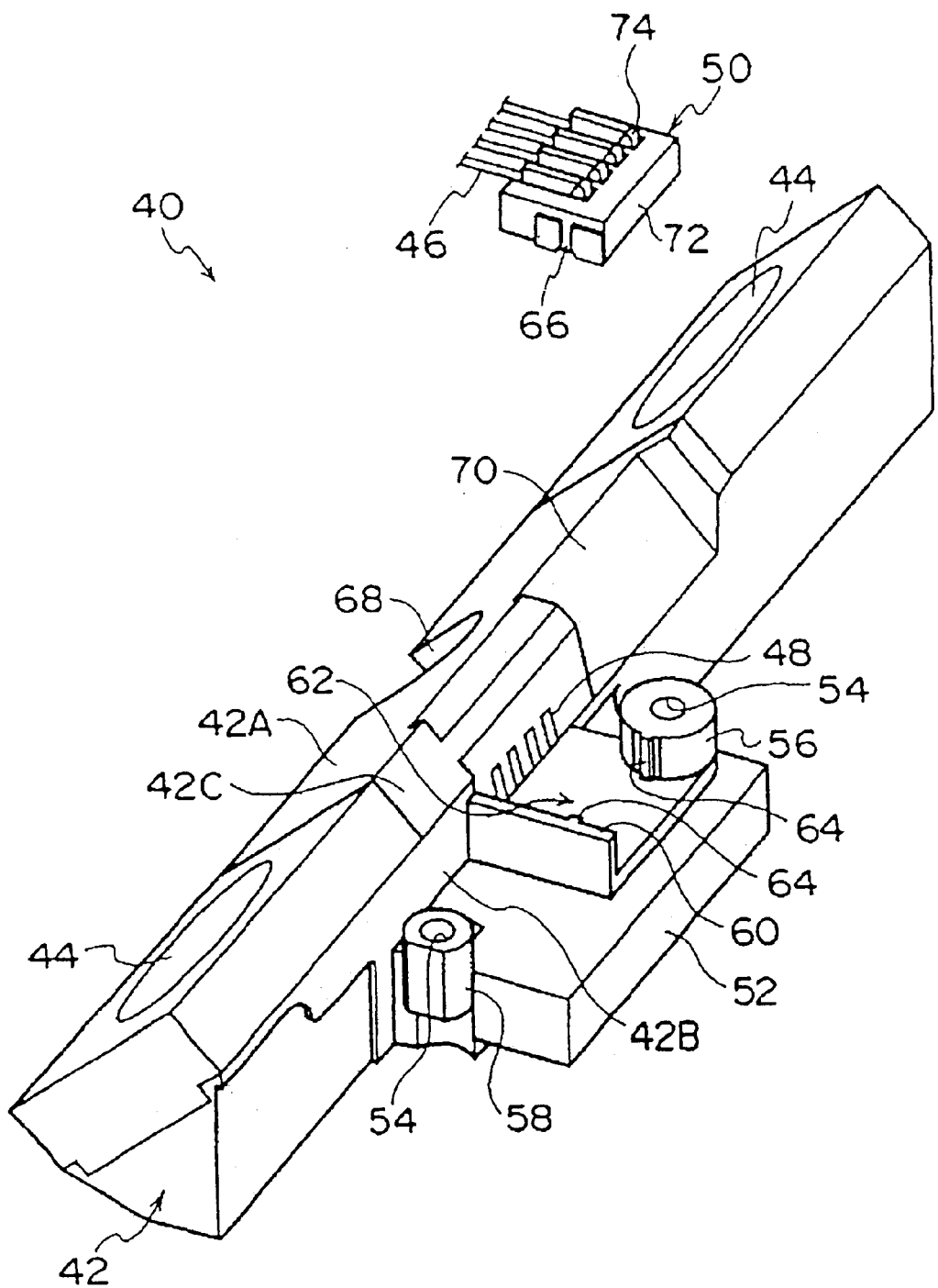
FIG. 4 is a perspective view showing the mounting face side of the speaker unit of FIG. 2, the connector being removed from the speaker unit.

First, the speaker unit 40 will be described in detail. In FIGS. 3 and 4 there are shown perspective views of the lower side (or mounting portion side) of the speaker unit 40.

The speaker unit 40 is equipped with a hollow frame 42 (formed for example from ABS resin) which is triangular in cross section. The two speakers 44 are disposed at the laterally opposite positions on the front face 42A of the frame 42.

The four lead wires 46 connected to the right and left speakers 44 pass the interior of the frame 42 and project in part from openings 48 formed in approximately the lateral center of the back face 42B of the frame 42, their point ends being connected with the aforementioned compression type connector 50.

The frame back face 42B is provided with a mounting portion 52 rectangular in cross section, which extends rearward. The mounting portion 52 is provided at the lateral opposite positions with bosses 56, 58 extending downward (in FIGS. 3 and 3, upward). Each boss has a through hole 54 through which the screw 120 is inserted. Between the bosses 56 and 58, a wall portion 60 is provided on the mounting portion 52. The bosses 56, 58 and the wall portion 60 are coplanar with one another.

A recess, surrounded by the boss 56 in one side, the wall portion 60, and the mounting portion 52, is used as a connector mounting portion 62 for mounting the connector 50 (refer to FIG. 4). The connector mounting portion 62 is disposed at approximately the lateral center of the frame 42 so that its position matches the openings 48, and the inside dimensions of the connector mounting portion 62 are matched with the outside dimensions of the connector 50.

As shown in FIG. 4, opposite ribs 64 extending along the projecting direction of the boss 56 are formed on the outer periphery of the boss 56 and the surface of the wall portion 60 which constitutes the connector mounting portion 62, respectively. On the other hand, slits 66 corresponding to these ribs 64 are formed in both sides of the connector 50 (in FIG. 4, only one of the two slits 66 is shown), respectively. In the state in which the connector 50 is mounted on the connector mounting portion 62, the slits 66 engage with the ribs 64 to fix the connector 50. In this manner, the connector 50 is not easily disengaged from the connector mounting portion 62.

A generally U-shaped recess 68 is provided in the central portion of the frame front face 42A (see FIG. 2). The recess 68 protrudes in the form of approximately a semi-circular cylinder from the housing 18 so that it conforms to a protruding portion 34 provided on the speaker-unit mounting portion 32. When the speaker unit 40 is mounted on the speaker-unit mounting portion 32, the recess 68 engages the protruding portion 34 without any gap. Thus, the speaker unit 40 is positioned so that it is not shifted laterally (in the direction of arrow A in FIG. 2).

Furthermore, a generally rectangular recess 70 is provided in the bottom face 42C of the frame 42. The bottom surface of the recess 70 is inclined in a predetermined direction with respect to the top faces of the bosses 56, 58, and protrudes from the housing 18 and is formed to conform the protruding portion 36 provided on the speaker-unit mounting portion 32.

The upper face of the protruding portion 36 is in the form of a taper and inclined from inside the PC main body 12 toward the front portion. When the speaker unit 40 is mounted on the speaker-unit mounting portion 32, the recess 70 engages the protruding portion 36. In this way, the speaker unit 40 is supported at a predetermined height, and is interposed between the protruding portion 36 and the protruding portion 34, whereby the speaker unit 40 is positioned so as not to be shifted in a fore-and-aft direction (direction of arrow B in FIG. 2) as well.

With the speaker unit 40 positioned at the mounting position, the holes 54 of the bosses 56, 58 through which the screws 120 are inserted are aligned with their respective holes 39 formed in the system board 28, and female screws in the support portions located under the holes 39 and provided in the housing 18.

Figure 5:
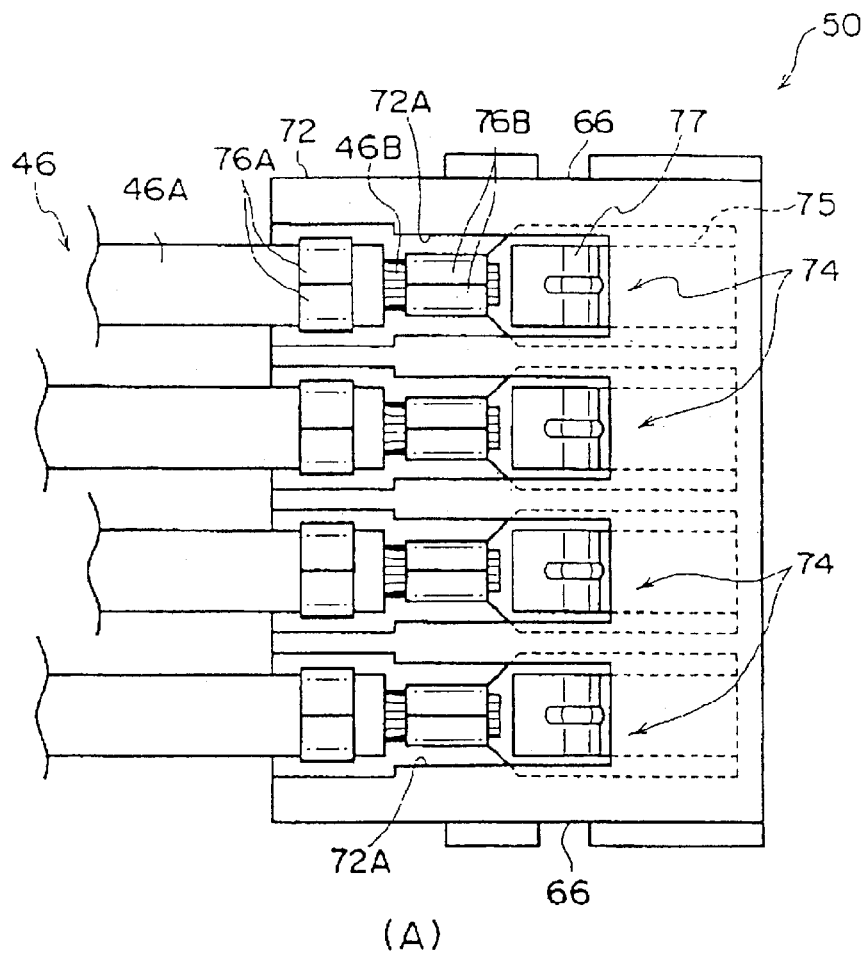
FIG. 5A is a plan view of the connector according to the preferred embodiment.
FIG. 5B is a side view of the connector according to the preferred embodiment.
Figure 5:
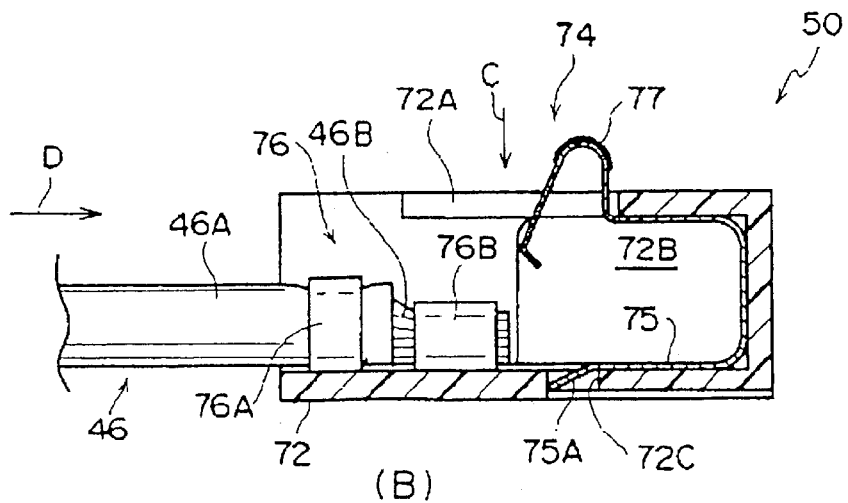

Next, the connector 50 will be described in detail. The connector 50, as shown in FIGS. 5A and B, is equipped within a plastic housing 72 with 4 (four) compression type terminals 74 (hereinafter referred to as simply terminals 74). To these terminals 74, the positive and negative electrodes of the right and left speakers 44 are assigned.

The terminal 74 is formed from a thin metal plate with good electric conductivity (e.g., copper, etc.) and, as shown in FIG. 5B, has a generally J-shaped cross section. Also, the approximately intermediate portion of the terminal 74 forms a terminal main body portion 75 (with a general U cross section). The terminal main body portion 75 is provided at one end thereof with a lead-wire connecting portion 76 for connecting the lead wire 46. The other end of the terminal main body portion 75 forms a contact portion 77, which protrudes from the cutout 72A of the housing 72 by a predetermined amount and is deformable inward of the housing 72 (in a direction of arrow C in FIG. 5A) by the elastic force of the terminal main body portion 75.

The terminal main body portion 75 is fitted into the recess 72B of the housing 72. In the fitted state, a projecting piece portion 75A formed by bending part of the elastically deformable terminal main body portion 75 engages a square hole 72C formed in the housing 72. In this manner, the terminal 74 is installed so that it is not disengaged from the housing 72.

The lead-wire connecting portion 76 is constructed of an outer caulking portion 76A and an inner caulking portion 76B. The vinyl covering portion 46A of the lead wire 46 is firmly (mechanically) held by the outer caulking portion 76A, and the core 46B is caulked by the inner caulking portion 76B, whereby the lead wire 46 is electrically connected to the terminal 74.

Note that the terminal 74 is easily manufactured, for example, by pressing and forming processes, employing a metal mold. In the preferred embodiment, a flat material is cut into a predetermined shape by a metal mold. After the flat material with the predetermined shape has been bent as shown, the lead wire 46 is caulked with the lead-wire connecting portion 76 by the use of a caulking machine. The terminal 74 thus manufactured is inserted and assembled to the housing 72 in a direction of arrow D shown in FIG. 5B, whereby the above-mentioned connector 50 is completed.

Figure 6:
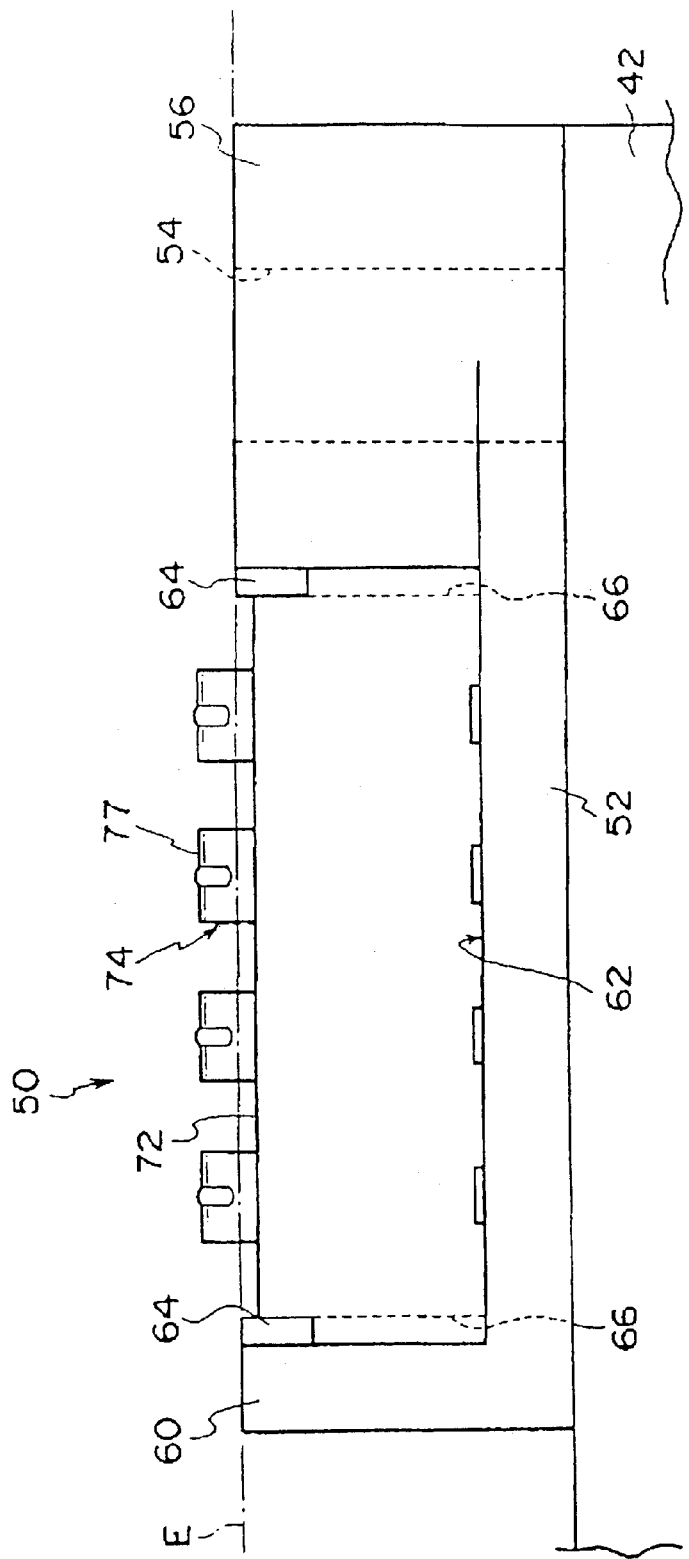
FIG. 6 is an enlarged view showing the rear side of the connector of FIG. 5 mounted on the speaker unit.

FIG. 6 shows the rear side of the connector 50 mounted on the connector mounting portion 62 of the speaker unit 40. As shown in the figure, the contact portion 77 of each terminal 74 protrudes from a plane E which is at the same level as the top surfaces of the boss 56 and wall portion 60 (and the boss 58) by a predetermined amount.

With this, in the state in which the speaker unit 40 is mounted on the speaker-unit mounting portion 32, the top faces of the bosses 56, 58 and the wall portion 60 abut the system board 28, and the contact portion 77 of the terminal 74 contacts with the land 38 and is elastically deformed and compressed.

For the positional relationship between the lands 38 of the system board 28 and the terminals 74 of the connector 50, the relative position is precisely adjusted by the aforementioned structure, etc., which positions the speaker unit 40.

More specifically, the lands 38 are precisely patterned with respect to a mounting reference (e.g., well-known means, such as means for positioning due to abutting by the ribs on the housing abutting the board end face, or for positioning due to engaging by fitting the boss on the housing into a reference hole formed in the board, not shown) provided between both members when the system board 28 is mounted on the housing 18. In the housing 18, the position and size of the protruding portion 34 of the speaker-unit mounting portion 32 and the position and height dimension of the protruding portion 36 with respect to the mounting reference are precisely molded.

On the other hand, for the terminals 74, the size and relative position dimensions of the recesses 68 and 70 of the frame 42 and the connector mounting portion 62 are precisely molded. With the connector 50 mounted on the connector mounting portion 62, the positional precision of the terminals 74 to the recesses 68, 70 is enhanced.

Therefore, if the speaker unit 40 is mounted on the speaker-unit mounting portion 32, the terminals 74 are positioned on the corresponding lands 38, are compressed against them, and can be electrically connected with them.

Next, the operation of the preferred embodiment will be described.

Figure 7:
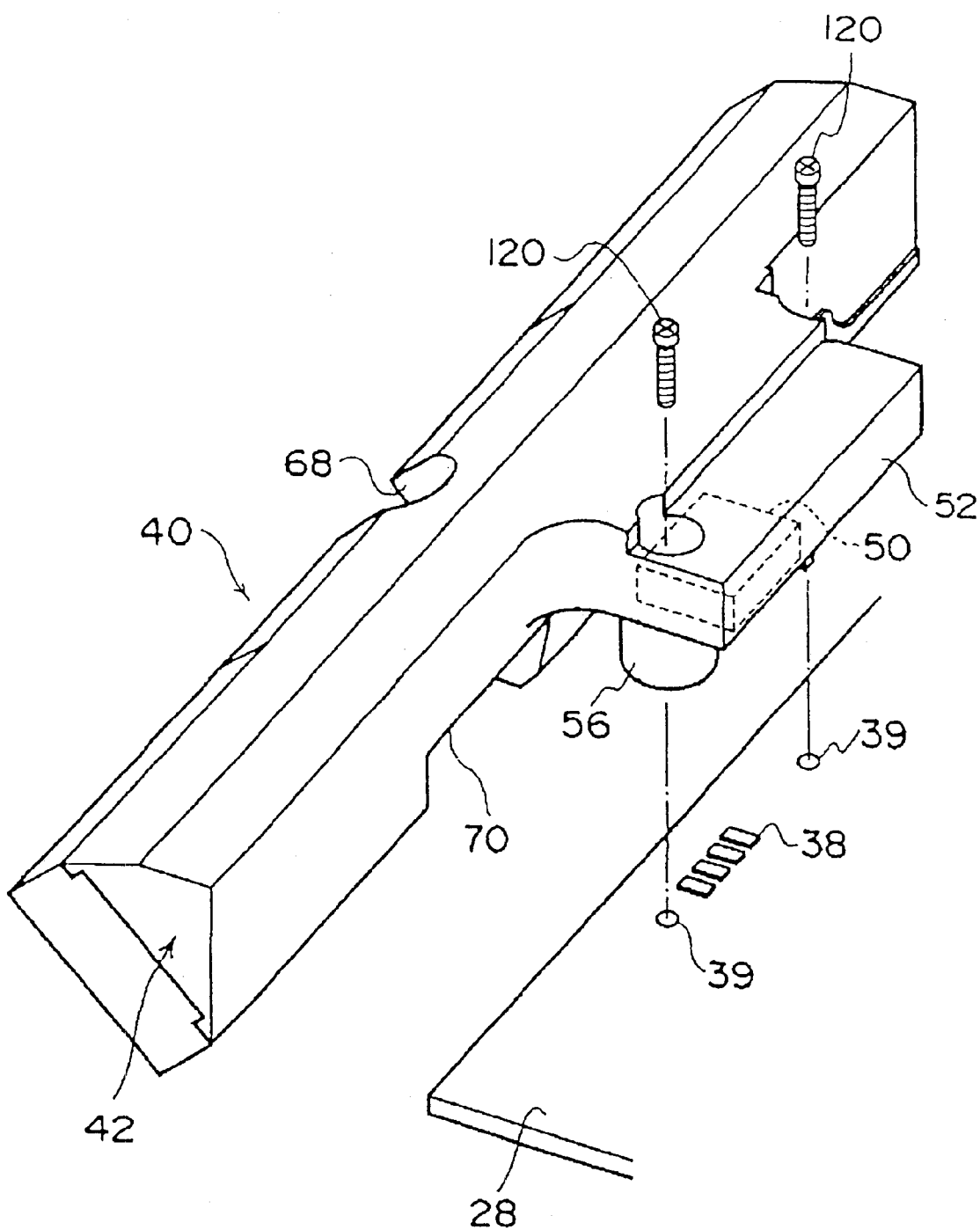
FIG. 7 is a perspective view showing how the speaker unit according to the preferred embodiment is fixed on the system board.

When installing the speaker unit 40 on the PC main body 12, the speaker unit 40 is directed as shown FIGS. 2 and 7 and is fitted on the speaker-unit mounting portion 32.

Figure 8:
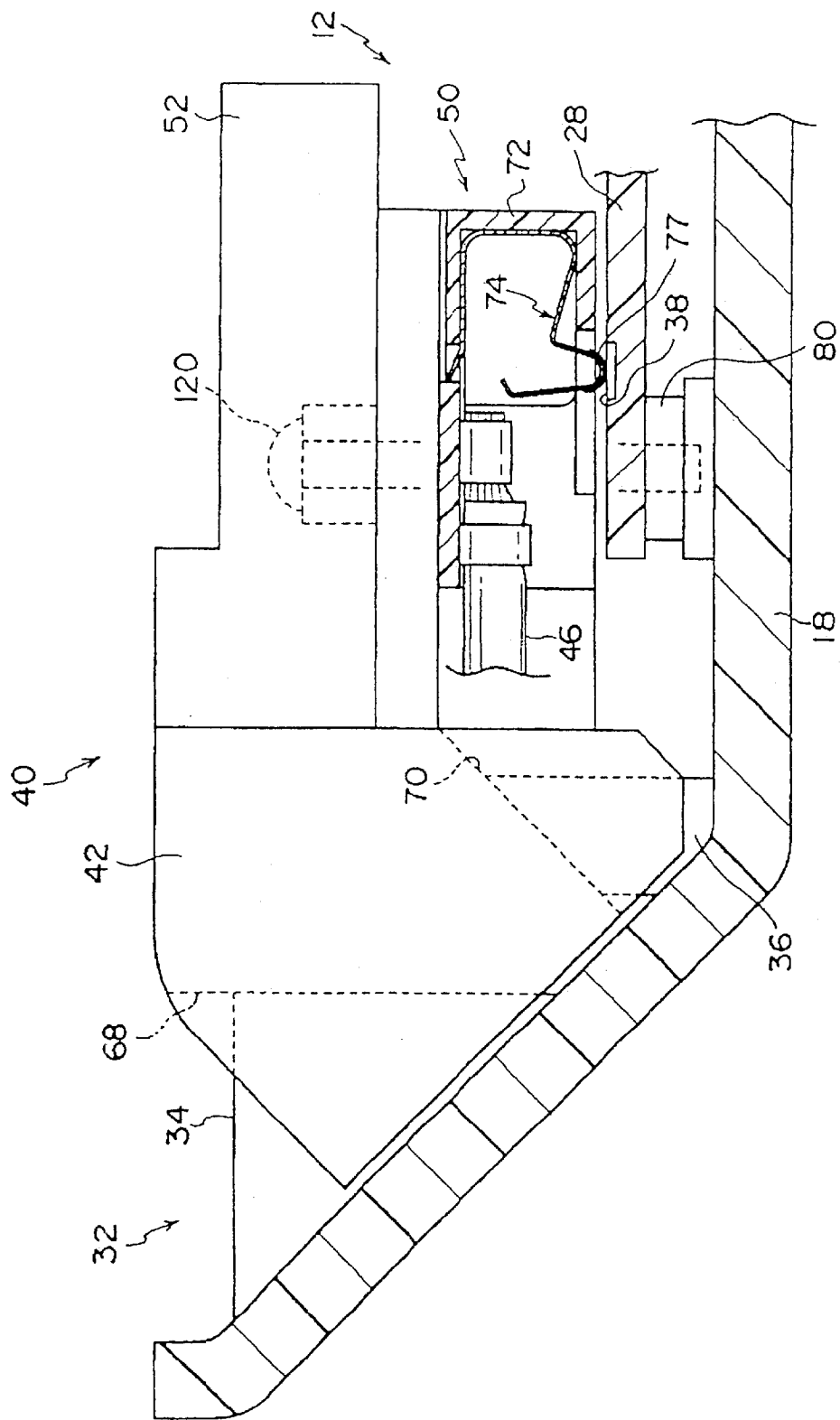
FIG. 8 is a side sectional view showing the state in which the speaker unit according to the preferred embodiment is fixed on the system board.

Then, the recess 68 of the speaker unit 40 engages the protruding portion 34 of the housing 18 and is laterally positioned. At the same time, as shown in FIG. 8, the recess 70 abuts the protruding portion 36, whereby the speaker unit 40 is supported between the protruding portion 36 and the protruding portion 34, and is positioned in the fore-and-aft direction, with the taper surfaces of the recess 70 and the protruding portion 36 engaged with each other. At this stage, the contact portions 77 of the terminals 74 disposed on the connector 50 are in contact with the corresponding lands 38 and the mounting portion 52 is floating slightly.

And if the screws 120 are inserted into the holes 54 of the bosses 56, 58 and meshed with the female screws of the support portions 80 provided on the bottom surface of the housing 18, the top faces of the bosses 56, 58 and wall portion 60 abut the system board 28 and therefore the speaker unit 40 is fixed to the speaker-unit mounting portion 32.

Figure 9:
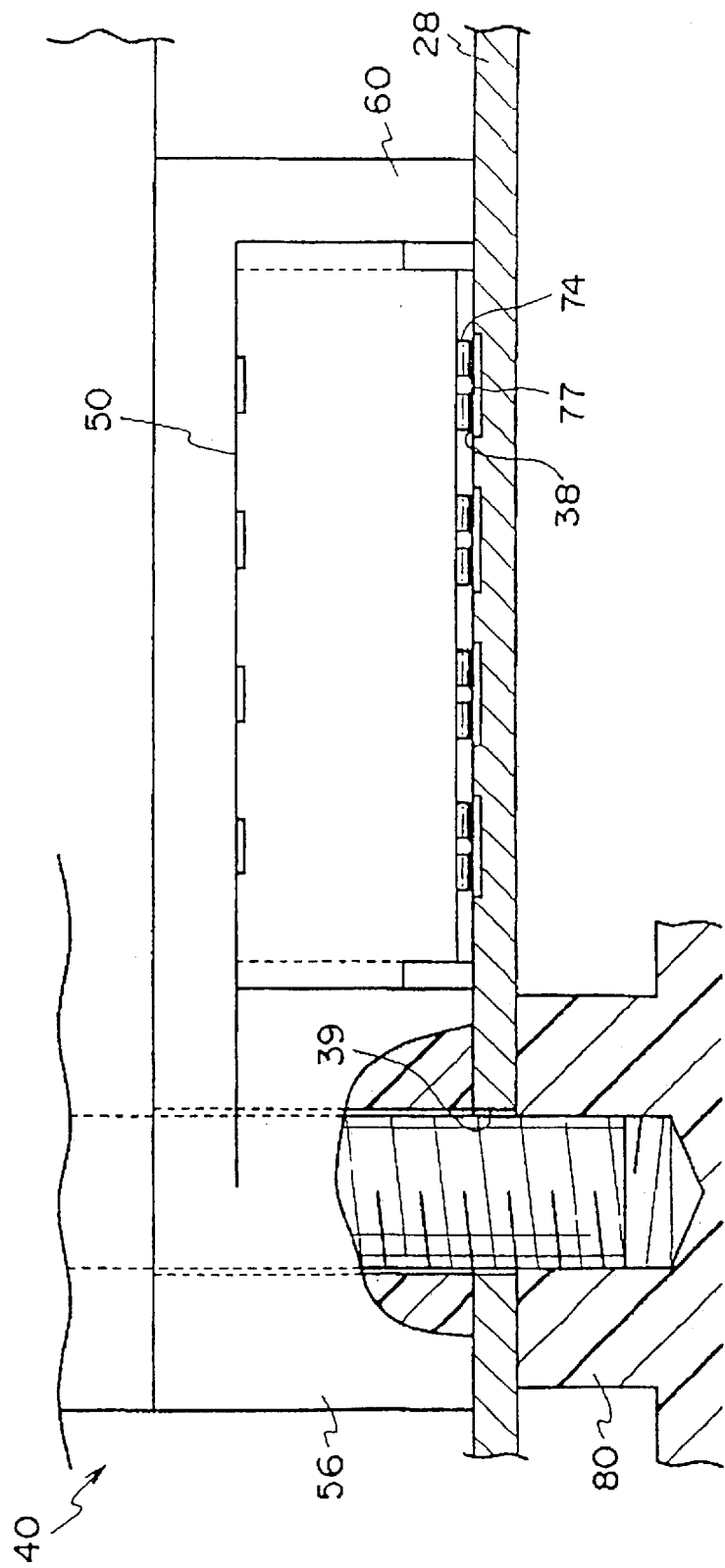
FIG. 9 is an enlarged rear view of the speaker unit showing the state in which the compression type terminals of the connector of FIG. 5 are compressed against the lands on the system board.
Figure 10:
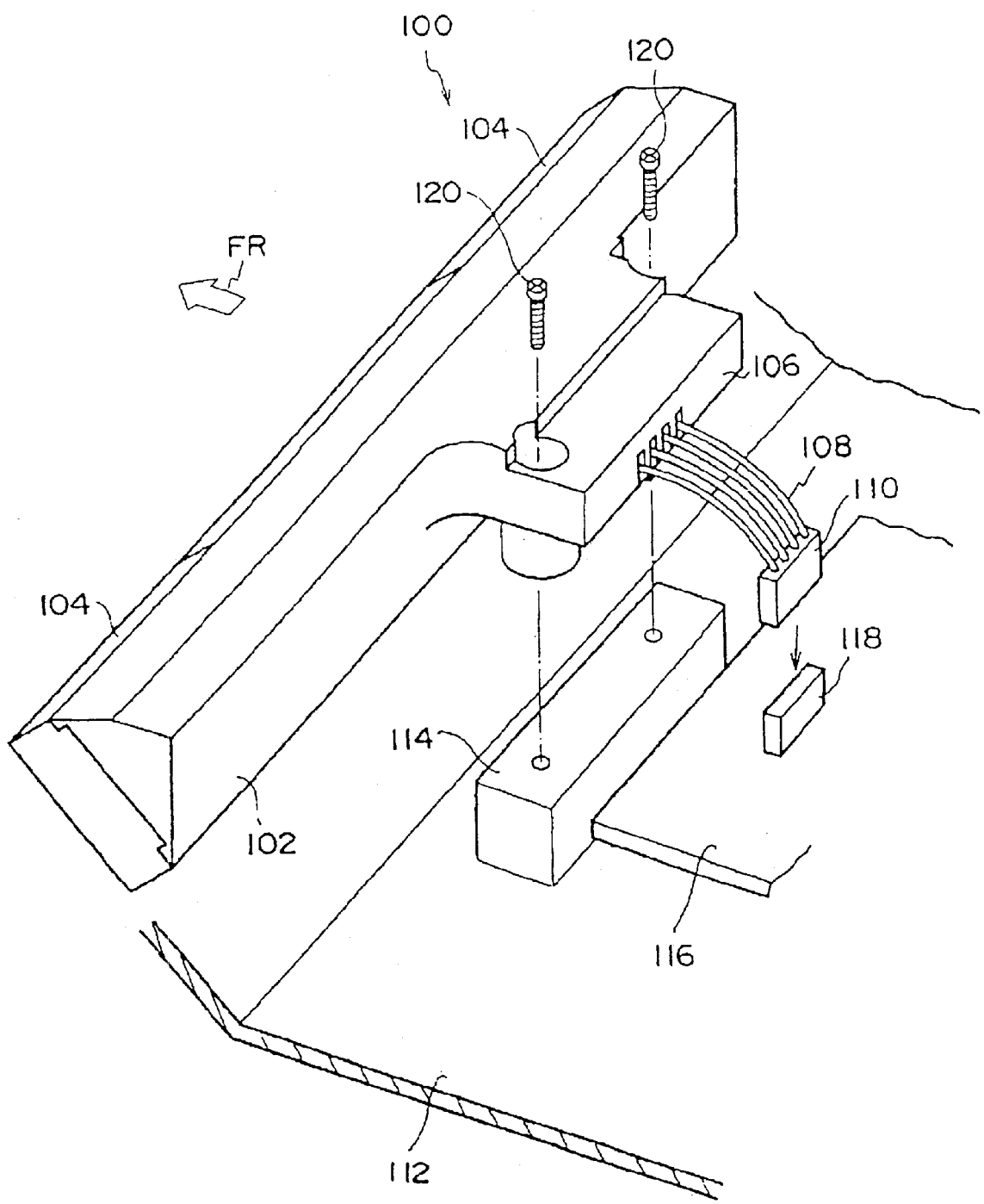
FIG. 10 is a perspective view showing the situation in which a conventional speaker unit is fixed to a system board.

And consequently, as shown in FIG. 9, the terminals 74 are elastically deformed, and with the elastic force, the contact portions 77 are elastically contacted with the lands 38, whereby an electrical connection is made between the speaker unit 40 and the system board 28. Therefore, such a connector connecting operation which is performed by plug-in type connectors becomes unnecessary.

If the tightened screws 120 are loosened and the speaker unit 40 is removed as it is, when removing the speaker unit 40, the connection between the terminals 74 and the lands 38 is also released. Note that the terminal 74 returns to the original shape when the force applied thereto is removed, because it is elastically contacted with the land 38 only by the elastic force. Therefore, even if the mounting and dismounting of the speaker unit 40 are repeated, it can be used without causing any problem.

In the electrical connection structure for an electronic component unit according to the preferred embodiment, as has been described supra, the connector 50 with the terminals 74 is installed integrally on the speaker unit 40, and the lead wires 46 of the speaker 44 are connected directly to the terminals 74.

With this, at the same time the speaker unit 40 is assembled to the system board 28 of the PC main body 12, the contact portions 77 of the terminals 74 are pressed against the lands 38 of the system board 28, whereby they are electrically connected with one another. Thus, the operation of mounting the speaker unit 40 becomes easy. Furthermore, since there is no connector connection by manual operation, there is no failure such as an unconnected state, a half-locked state, etc., and at the same time, the number of assemblers is reduced and the manufacturing costs are also reduced.

In addition, if, in the preferred embodiment, the connector 50 is mounted on the connector mounting portion 62 of the speaker unit 40, the slits 66 provided on both sides of the housing 72 engage the ribs 64 of the connector mounting portion 62 and therefore the connector 50 is held in that position. Thus, the connector 50 can be readily mounted without an adhesive.

Furthermore, in the preferred embodiment, the fixing structure by the screws 120 and support portions 80 is disposed near the connector 50, so the connection between the terminals 74 and the lands 38 becomes firm when the speaker unit 40 is fixed to the system board 28. As a result, connection failure, etc., are avoided.

The terminal 74 in the preferred embodiment is constructed so that the contact portion 77, which are pressed against the land 38, and the lead-wire connecting portion 76, which is connected to the lead wire 46, are connected integrally to the terminal main body portion 75. With this structure, the terminals 74 can be easily assembled to the housing 72. In addition, as the protruding piece portion 75A of the terminal main body portion 75 engages the square hole 72C of the housing 72, the terminals 74 are securely fixed.

If, in the preferred embodiment, the speaker unit 40 is mounted on the speaker-unit mounting portion 32, the terminals 74 are supported by the protruding portion 36 at a position electrically connectable to the lands 38, and the recess 68 engages the protruding portion 34 and the recess 70 engages the protruding portion 36, whereby the movement (movement in fore-and-aft and lateral directions) of the speaker unit 40 on a plane approximately perpendicular to the mounding direction is prevented. Therefore, there is no possibility that the contact portions 77 of the terminals 74 will be shifted from the lands 38, and with this engaged state, the speaker unit 40 can be simply fixed by tightening the screws 120. In addition, this structure is preferred because, in repair, etc., at service centers, loads on repairmen are reduced.

Note that the positioning operations will be sufficient if the movement of the speaker unit 40 in the supporting direction and on a plane approximately perpendicular to the mounting direction can be prevented. In the preferred embodiment, the positioning operations are achieved by a combination of the engagement structure between the protruding portion 34 and the recess 68 and the engagement structure between the protruding portion 36 and the recess 70. However, these two structures may be a combination of 3 or more engagement structures having a function of preventing movement in the supporting direction, a function of preventing movement in the lateral direction, and a function of preventing movement in the fore-and-aft direction, respectively.

The present invention is also applicable to applications other than the electrical connection between the system board 28 and the speaker unit 40, positioned through the housing 18. In the notebook-sized PC 10 of the preferred embodiment, positioning is performed directly between the CPU cooler 22, equipped with the fan 21, and the system board 28, and at the electrical connection portions, a compression type connector and the corresponding lands are disposed. Therefore, similar advantages are obtained.

Furthermore, the electrical connection structure for an electronic component unit according to the present invention, in addition to notebook-sized PCs, is applicable to any electronic equipment if it mounts an electronic component unit and makes a connector connection.

As the electrical connection structure for an electronic component unit according to the present invention is constructed as described above, the assembly operation in mounting an electronic component unit becomes easy and prevention of connection failure of a connector and a reduction in cost are achieved.

While the present invention has been described with reference to a preferred embodiment thereof, the invention is not to be limited to the details given herein, but may be modified within the scope of the invention claimed.

What is claimed:

1. A computer system comprising:

a housing which houses computer system components including a circuit board and having an electronic component unit mounting area having a generally rectangularly shaped base protrusion protruding tangentially from a first plane parallel to the base of said housing and a generally U-shaped base protrusion protruding tangentially from a second plane other than the first plane, the electronic component unit mounting area of said housing further including a base fastening area, the circuit board further including a hole formed therein and aligned directly above the base fastening area of said housing;

an electronic component unit subassembly having a component fastening area and a generally U-shaped recess which conforms to the U-shaped base protrusion of the electronic component unit mounting area and a generally rectangular recess which conforms to the generally rectangular base protrusion of the electronic component unit mounting area;

wherein the upper face of the rectangularly shaped base protrusion inclines toward the U-shaped base protrusion along a third plane, the third plane being other than the first and second planes, such that when said electronic component unit subassembly is mounted on the electronic component unit mounting area with a force tangent to the base of said housing, the rectangular recess engages the rectangularly shaped base protrusion whereby the incline forces the U-shaped recess of the electronic component unit subassembly into fixed engagement with the U-shaped base protrusion of the electronic component unit mounting area and whereby said electronic component unit subassembly is held firmly along all of the first, second and third planes and such that alignment is achieved between the component fastening area, the hole formed in the circuit board, and the base fastening area, said circuit board further comprising an electrode, and wherein said electronic component unit subassembly further comprises a connector mounted on said electronic component unit subassembly and equipped with a compression type terminal, the terminal being connected to a lead wire of an electronic component in said electronic component unit subassembly; and a fastener which fastens said electronic component unit subassembly to the circuit board and to the base of said housing by fastening the component fastening area, the circuit board through the hole formed in the circuit board, and the base fastening area, whereby the compression terminal makes contact with the electrode, is compressed, and is electrically connected thereto.

* * * * *